Sept. 6, 1938. L. ADLER Re. 20,843

MINIATURE PACKET

Original Filed Dec. 4, 1931

INVENTOR.
LEON ADLER
BY:- Ben V. Zillman
ATTORNEY.

Reissued Sept. 6, 1938

Re. 20,843

UNITED STATES PATENT OFFICE 20,843

MINIATURE PACKET

Leon Adler, St. Louis, Mo.

Original No. 1,985,882, dated January 1, 1935, Serial No. 578,983, December 4, 1931. Reissue No. 20,517, dated September 28, 1937, Serial No. 34,777, August 5, 1935. This application for reissue September 28, 1937, Serial No. 166,039½

8 Claims. (Cl. 206—56)

My invention relates to improvements in miniature packets, and more particularly to those packets adapted to contain coloring material to be intermixed with a food product or the like in coloring the latter to the desired tint or shade for use.

Among the objects of my invention are the production of such packets that will be neat and attractive in appearance, convenient to use, economical to make, and satisfactory and efficient for use wherever found applicable.

Other objects of my invention are the provision of a packet that will be substantially moisture-proof and air-proof, of minimum weight, substantially flat so that the same may be mailed without special packing and otherwise handled, and transparent whereby the user may easily ascertain when it has been completely emptied.

A further object of my invention is the production of a packet of the kind described, in which the packet shall be of a plurality of superimposed sheets cut to a polygonal outline so as to prevent waste of material in cutting and to obtain a maximum of sealing area about the material being packaged.

An additional object of the invention is the production of a packet of the kind described, which shall have a cover sheet of a pliant, transparent, and substantially air-proof and moisture-proof material, and a reinforcing sheet of a sturdier or more rigid material and preferably cheaper, superimposed thereon, so that the packet will be form-sustaining and not too flimsy and thus be better able to withstand the usage to which it may be put.

Still further objects of my invention are the provision of a packet of the kind described, which shall be of flat, polygonal shape readily handled in the cutting, filling and sealing operations through automatic machinery, and which may be easily torn and emptied by the ultimate user.

Many other objects and advantages of the invention herein shown and described will be obvious to those skilled in the art to which this invention appertains, from the disclosures herein given.

To this end, my invention consists in the novel construction, combination and arrangement of parts, and the method of obtaining the same, herein shown and described, and more particularly pointed out in the claims.

In the drawing, whereby like or corresponding parts are indicated by like reference characters throughout the views, Figure 1 is a plan view of a portion of a packet strip or sheet before the individual packets have been separated from one another;

Figure 1:
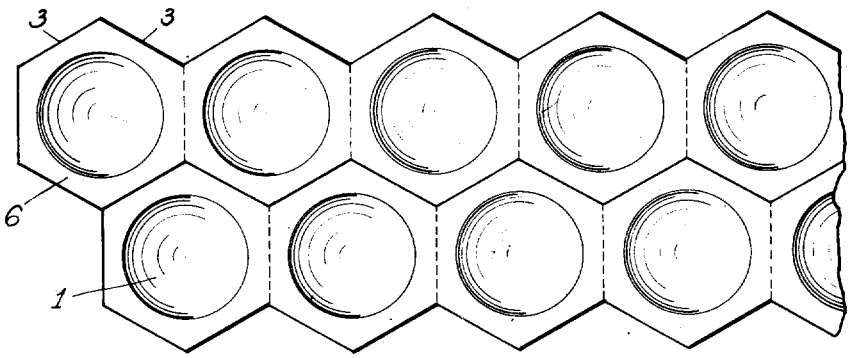
Figure 2:
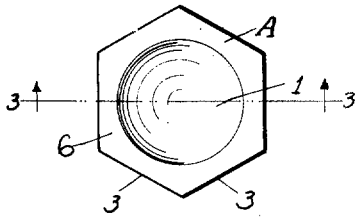
Figure 2 is a plan view of one of the individual packets, ready for use.
Figure 3:
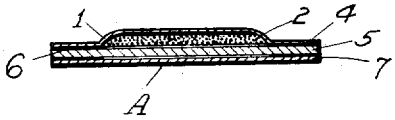
Figure 3 is a cross-sectional view through one of such individual packets, taken substantially along the line 3—3 of Fig. 2.

Referring more particularly to the drawing, wherein I have illustrated one of the preferred embodiments of my invention, A represents one of the miniature, individual packets as it appears ready for use, and is preferably of flat shape with a shallow pocket 1 having a small quantity of coloring matter 2 therein, as for instance a powdered compound of yellow AB or OB dye with a suitable diluent or carrier therefor, the quantity varying with the particular purpose intended. This pocket may be circular in shape, but the packet itself is preferably of a polygonal shape, as for example, the hexagonal form shown, this hexagonal shape adapting itself well to handling in automatic machinery, and with no waste of material, the sides of the hexagon being indicated at 3.

The packet A may be formed of a sheet of relatively pliant or filmsy material which is substantially air-proof and moisture-proof and transparent, such as regenerated cellulose, as Cellophane or the like 4, or any other non-fibrous film superimposed upon a relatively cheaper, stiffer and sturdier material, such as the paper sheet 5. The reinforcing sheet may preferably be made opaque in order that it shall form a good background for colored material that may be placed in the packet. The transparent, pliable sheet 4 and the reinforcing sheet 5 are sealed together completely about their marginal areas bounding the pocket 1, as at 6, and it is to be particularly stressed at this time that the hexagonal shape of packet will give a maximum of sealing area about the pocket with a minimum of waste of paper cut from the blank sheet, and the sealing area about the pocket will be nearly uniform in width about the periphery.

If desired, a second sheet of material 7, similar to the sheet 4, may be superimposed on the other side of the reinforcing sheet, similarly to the sheet 4, and in which case the reinforcing sheet need not be of a moisture-proof and air-proof material, but yet the resultant packet as a whole will have the desired weather-proof properties. The second sheet 7 may be sealed to the reinforcing sheet about the opposed marginal areas similar to the width of the sealed area 6.

The packet is preferably substantially flat so that it may be placed within an ordinary mailing envelope, or otherwise handled, and has the shallow and slightly bulged pocket centrally between the sealed marginal edge, and is weather-impervious. Further, the packet will be form-sustaining even though the cover sheet is of a relatively pliant and flimsy material. The packet is regular in shape and may be easily emptied, the slight bulge of the pocket aiding in this step. Further, the packet is attractive in appearance, is easily identified by the purchasers, and it is easy to ascertain complete emptying. The composite packet is much more readily torn and therefore more easily emptied than if it did not have the sheet 5 as part thereof, as such sheet has practically no stretch, while the regenerated cellulose sheet or sheets alone are relatively difficult to tear across, as may be easily demonstrated by test.

These packets, although intended principally for the packaging of food coloring matter, and the like, are also adapted to the packaging of other commodities, especially where small quantities of material are to be so packaged, as for example samples and even commercial sizes of commodities, where attractiveness of package, and ease of handling and mailing, visibility of contents and protection from the atmosphere, and easy tearing of the packet for emptying the contents, are desired.

These packets may be formed by passing one of the sheets of flimsy material, or both of them, through suitable machinery (not shown), so as to preferably obtain automatic handling and economy of operation. The reinforcing sheet of paper also preferably travels in the same direction as the more pliant cover sheets so as to be superimposed thereon or therebetween before its discharge from the machine. At some suitable stage of progress, individual portions of material 2 are introduced between one of the pliant sheets and the reinforcing sheet at intervals suitably spaced apart, and then the superimposed sheets are pressed together with suitable adhesive, preferably dry, or other sealing material therebetween, so as to seal completely about the pockets of material. When dry adhesive is used, heat may be applied at the time of pressure of the sheets toward one another, to thereby soften the adhesive. The bulge for the pockets is formed in any suitable manner during the progress of the sheets through the machinery, this bulge extending outwardly from the plane of the material of the bounding edges of the sheet or packet strip.

The sealed sheets having the pockets of material deposited therebetween and completely sealed in place may then be formed into individual packets in any desired manner, as by cutting a single width of packet along the continuous length of the sealed sheets, with longitudinally extending zig-zag, toothed or serrated lines to form pairs of adjoining side edges 3—3 of the haxagon. Then, the individual packets are finally formed by severing transversely of the single serrated strips of packets, intermediate the pockets therein, as along the dotted lines shown in Fig. 1. No trimming of sheets is required, and hence no waste, and there will be a maximum of sealing area of substantially uniform width about the pocket of sealed material.

Having thus described my invention, it is obvious that various immaterial changes may be made therein; hence I do not wish to be understood as limiting myself to the exact form, arrangement, structure and combination of parts claimed and described, except as limited by the state of the art to which this invention appertains, and the claims hereto appended.

What I claim as new and desire to secure by letters patent is:

1. A container consisting of a pair of opposed relatively difficult to tear non-fibrous cellulose sheets sealed to provide a pocket therebetween adapted to receive a predetermined quantity of material; and a sheet of paper between said pair of sheets and sealed thereto and extending to a marginal edge of the latter to facilitate tearing through said marginal edge.

2. A container consisting of a pair of substantially moisture and air-proof relatively difficult to tear non-fibrous cellulose sheets secured along their marginal edges and spaced apart adjacent the central portion to provide a material-receiving pocket thereat; and a sheet of paper between said sheets and secured thereto and extending to a marginal edge of said pair of sheets to facilitate tearing through said marginal edge.

3. A container of the kind described, consisting of a pair of pliant sheets of relatively difficult to tear non-fibrous cellulose and a paper sheet therebetween, and all of said sheets fixedly secured together along their bounding edges.

4. A container comprising a pair of relatively difficult to tear non-fibrous cellulose sheets spaced apart for a portion of their opposed areas; and a more readily tearable reinforcing sheet superimposed on one of said sheets, all of said sheets secured together at a marginal edge of the cellulose sheets and whereby tearing through said marginal edge is facilitated.

5. A container of the kind described, comprising a pair of pliant sheets of a material relatively difficult to tear and spaced apart over a portion of their opposed areas; and a more rigid and more easily tearable sheet superimposed on one of said pliant sheets and fixedly secured to the latter at a bounding edge of the same.

6. In a container having a pocket adapted to removably contain an article and to be emptied of said article by tearing through a marginal edge of the container, a relatively difficult to tear non-fibrous cellulose lamination; a more readily tearable lamination superimposed thereon; and a third lamination superimposed on said beforementioned laminations and spaced from said first lamination over a portion of their opposed areas, all of said laminations being fixedly secured together adjacent said marginal edge.

7. In a container of the kind described, a pair of layers of relatively difficult to tear non-fibrous cellulose spaced apart over a portion of their opposed areas; and a paper layer superimposed thereon, all of said layers fixed together at a bounding edge to facilitate tearing through the same.

8. A container of the kind described, comprising two pliant sheets spaced apart over a portion of their opposed areas and each of which is of a material relatively difficult to commence tearing through; and a more rigid and more easily tearable sheet superimposed on one of said pliant sheets and fixedly secured to the latter at a bounding edge of the same.

LEON ADLER.